United States Patent [19]

White et al.

[11] Patent Number: 5,149,768

[45] Date of Patent: Sep. 22, 1992

[54] HYDROXY-FUNCTIONAL POLY(ETHER SULFONAMIDES) AS THERMOPLASTIC BARRIER RESINS

[75] Inventors: Jerry E. White; Anthony P. Haag; R. Garth Pews, all of Midland, Mich.

[73] Assignee: The Dow Chemical Company, Midland, Mich.

[21] Appl. No.: 718,684

[22] Filed: Jun. 21, 1991

[51] Int. Cl.$^5$ .............................................. C08G 59/44
[52] U.S. Cl. .................................... 528/89; 528/93; 528/97; 528/98; 528/99; 528/104; 528/109; 528/391; 428/36.6; 428/36.7; 428/413; 525/523
[58] Field of Search ...................... 528/89, 93, 97, 98, 528/99, 104, 109, 391; 525/523

[56] References Cited

U.S. PATENT DOCUMENTS

| | | | |
|---|---|---|---|
| 2,712,001 | 6/1955 | Greenice | 528/109 |
| 3,277,050 | 10/1966 | Pettigrew | 528/109 |
| 3,819,581 | 6/1974 | Smith | 528/109 |
| 3,849,375 | 11/1974 | Smith | 528/109 |
| 4,528,359 | 7/1985 | Berman et al. | 528/109 |
| 4,618,526 | 10/1986 | Berman et al. | 528/109 |
| 4,996,284 | 2/1991 | Mallavarapu | 528/109 |
| 5,001,175 | 3/1991 | Skora | 528/109 |

*Primary Examiner*—John C. Bleutge
*Assistant Examiner*—Frederick Krass

[57] ABSTRACT

Hydroxy-functional poly(ether sulfonamides) prepared by polymerizing an N,N'-dialkyl or N,N'-diaryldisulfonamide with a diepoxide in the presence of a suitable catalyst exhibit high barrier properties. These are suitable for use in the manufacture of articles such as rigid containers and flexible films exhibiting high barrier to oxygen.

10 Claims, No Drawings

HYDROXY-FUNCTIONAL POLY(ETHER SULFONAMIDES) AS THERMOPLASTIC BARRIER RESINS

BACKGROUND OF THE INVENTION

This invention relates to thermoplastic polymers having aromatic ether moieties in the backbone chain and pendant hydroxyl moieties and to articles prepared from such polymers.

Hydroxyphenoxyether polymers are known to be useful in the fabrication of articles exhibiting barrier properties. See, for example, Reinking et al, *J. Poly Sci.*, Vol. 7, pp. 2135-2144, pp. 2145-2152 and pp. 2153-2160 (1963) and *Encyclopedia of Polymer Science and Technology*, Vol. 10, pp. 111-122. Such polymers generally exhibit oxygen transmission rates of 2 to 75 cm$^3$-mil/100 in$^2$-atm-day.

In view of the limited barrier properties of the prior art polymers having pendant hydroxyl moieties and phenoxyether moieties, it would be highly desirable to provide a polymer having a genuinely high barrier (i.e., oxygen transmission rate less than 3.0 CM$^3$-mil/100 in$^2$-atm-day) to oxygen.

SUMMARY OF THE INVENTION

The present invention is, in one aspect, a normally solid thermoplastic barrier polymer having aromatic ether moieties and sulfonamide moieties in the backbone chain and pendant hydroxyl moieties. By "normally solid," it is meant that the polymer is solid at ambient temperature, e.g., 15° C. to 35° C.

The polymer of this invention, hereinafter called a hydroxy-functional poly(ether sulfonamide), surprisingly exhibits both thermoplastic character and excellent barrier to oxygen.

For the purposes of this invention, the term "barrier polymerk" means that the polymer exhibits an oxygen transmission rate which is less than 3, preferably less than 2, most preferably less than 1 cubic centimeters-mil/100 inch$^2$-atmosphere-day.

In another aspect, this invention is a process for preparing the hydroxy-functional poly(ether sulfonamide) which comprises polymerizing an N,N'-dialkyldisulfonamide or N,N'-diaryldisulfonamide with a diepoxide in the presence of a suitable catalyst.

In yet another aspect, this invention is a container suitable for packaging oxygen-sensitive materials wherein the container is fabricated of the hydroxy-functional poly(ether sulfonamide).

In yet a further aspect, this invention is a substantially impermeable film or coating of the polymer.

In addition to their use as barrier containers and films, the polymers of this invention are also useful as molding, extrusion and casting resins.

DETAILED DESCRIPTION OF ILLUSTRATIVE EMBODIMENTS

Preferably, the hydroxy-functional poly(ether sulfonamide) is a thermoplastic represented by the formula:

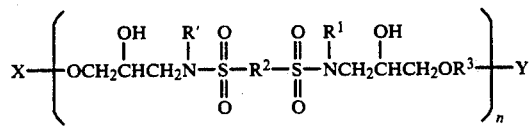

wherein each R$^1$ is independently a hydrocarbyl or substituted hydrocarbyl, wherein hydrocarbyl is a monovalent hydrocarbon such as alkyl, cycloalkyl, aralkyl or aryl and the substitutent(s) is a monovalent moiety, which is inert in the reactions used to prepare the hydroxy-functional poly(ether sulfonamide): each R$^2$ is a predominantly hydrocarbylene moiety, such as a divalent aromatic or a substituted divalent aromatic moiety; each R$^3$ is predominantly a divalent aromatic moiety or substituted divalent aromatic moiety: n is a whole number from 10 to about 1,000: X is

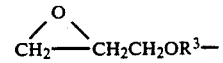

and Y is

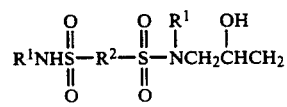

wherein R$^1$, R$^2$ and R$^3$ are as defined previously. Examples of such substituents include cyano, halo, amido, hydroxy and hyroxyalkyl.

"Predominantly hydrocarbylene" is defined as a divalent radical that is predominantly hydrocarbon, but which optionally contains a minor amount of heteroatomic moiety such as oxygen, sulfur, imino, sulfonyl, sulfoxyl and the like. "Aromatic moiety" is defined as a single aromatic ring or a plurality of aromatic rings fused together or linked together by a covalent bond or linking group wherein suitable linking groups include, for example, an oxygen atom, a sulfur atom, a sulfonyl group, an isopropylidene group or a carbonyl group.

In the more preferred polymers, R$^1$ is a methyl group or hydroxyethyl group, R$^2$ is a m-phenylene or 4,4'-biphenylene moiety, and R$^3$ is a p-phenylene, 4,4'-isopropylidenebiphenylene, 4,4'-sulfonyldiphenylene or 4,4'-thiodiphenylene moiety.

In the most preferred polymers, R$^1$ is a methyl, R$^2$ is m-phenylene, and R$^3$ is p-phenylene.

Advantageously, these hydroxy-functional poly(ether sulfonamides) are prepared by the reaction of a diglycidyl ether having the structure

wherein R$^3$ is defined above, with a disulfonamide having the structure

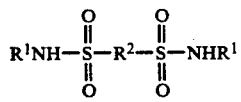

wherein R$^1$ and R$^2$ are defined above.

The hydroxy-functional poly(ether sulfonamides) of this invention are preferably prepared by contacting an N,N'-dialkyl- or N,N'-diaryldisulfonamide or a combination of disulfonamides with a diglycidyl ether or combination of diglycidyl ethers in the presence of an onium catalyst under conditions sufficient to form sulfonamide linkages and pendent hydroxyl moieties. Most preferred conditions are described hereinafter in the working examples.

Suitable disulfonamides include but are not limited to N,N'-dimethyl-1,2-benzenedisulfonamide, N,N'-dimethyl-1,3-benzenedisulfonamide, N,N'-dimethyl-1,4-benzenedisulfonamide, N,N'-bis(2-hydroxyethyl)-1,2-benzenedisulfonamide, N,N'-bis(2-hydroxyethyl)-1,3-benzene-disulfonamide, N,N'-bis(2-hydroxyethyl)-1,4-benzenedisulfonamide, N,N'-diphenyl-1,2-benzenedisulfonamide, N,N'-diphenyl-1,3-benzenedisulfonamide, N,N'-1,4-(benzenedisulfonamide, N,N'-dimethyl-4,4'-biphenylenedisulfonamide, N,N'-dimethyl-4,4'-oxydiphenylenedisulfonamide, N,N'-dimethyl-4,4'-thiodiphenylenedisulfonamide, N,N'-dimethyl-4,4'-methylenediphenylenedisulfonamide, and N,N'-dimethyl-4,4-sulfonayldiphenylenedisulfonamide. The disulfonamides are prepared by reactions of primary aliphatic or aromatic amines with bis(chlorosulfonyl) alkanes and arenes.

Preferred disulfonamides include N,N'-dimethyl-1,3-benzenedisulfonamide and N,N'-bis(2-hydroxyethyl)-4,4-biphenyldisulfonamide.

Examples of suitable diglycidyl ethers include but are not limited to the diglycidyl ethers of dihydric phenols such as 4,4'-isopropylidene bisphenol (Bisphenol A), 4,4'-dihydroxydiphenylethylmethane, 3,3'-dihydroxydiphenyldiethylmethane, 3,4'-dihydroxydiphenylmethylpropylmethane, bisphenol, 4,4'-dihydroxydiphenyloxide, 4,4'-dihydroxydiphenylcyanomethane, 4,4'-dihydroxybiphenyl, 4,4'-dihydroxybenzophenone, 4,4'-dihydroxydiphenyl sulfide, 4,4'-dihydroxydiphenyl sulfone, 2,6-dihydroxynaphthalene, 1,4-dihydroxynaphthalene, hydroquinone, resorcinol, catechol and other dihydric phenols listed in U.S. Pat. Nos. 4,438,254 and 4,480,082 which are hereby incorporated by reference.

Preferred diglycidyl ethers include the diglycidyl ethers of bisphenol A, hydroquinone, 4,4'-dihydroxydiphenyl sulfide, 4,4'-biphenol and 4,4'-dihydroxydiphenyl sulfone.

Suitable catalysts for the polymerization of N,N'-dialkyl- and N,N'-diaryldisulfonamides with diepoxides include quaternary ammonium salts and phosphonium salts such as tetraethylammonium chloride, tetraethylammonium bromide, tetraethylammonium iodide, tetraethylammonium hydroxide, tetra(n-butyl)ammonium bromide, tetra(n-butyl)ammonium chloride, tetra(n-butyl)ammonium iodide, tetra(n-butyl)ammonium hydroxide, tetra(n-octyl)ammonium bromide, methyltri(n-octyl)ammonium chloride, ethyltriphenylphosphonium acetate, tetraphenylphosphonium bromide, tetraphenylphosphonium chloride, and tetraphenylphosphonium iodide.

Preferred catalysts are tetraethylammonium hydroxide and ethyltriphenylphosphonium acetate.

The barrier containers, films and coatings of this invention are fabricated from the hydroxy-functional poly(ether sulfonamide) using conventional fabricating techniques for normally solid, thermoplastic polymers such as extrusion, compression molding, injection molding and similar fabrication techniques commonly employed to produce such articles.

The following working examples are given to illustrate the invention and should not be construed as limiting its scope. Unless otherwise indicated, all parts and percentages are by weight.

EXAMPLE 1

A. Preparation of N,N'-Dimethyl-4,4'-biphenyldisulfonamide.

Methylamine (64 g, 40% aqueous, 6 equiv.) is added over 10 minutes to a vigorously stirred mixture of 4,4'-biphenyldisulfonyl chloride and 750 mL of methylene chloride. During the addition, a cooling bath is used to maintain the temperature at less than 30° C. After stirring at ambient temperature for 3 hours, the mixture is suction filtered and the cake is then stirred with 500 mL of water for 1 hour. The white solid is collected by suction filtration, air dried overnight, and then recrystallized from 200 mL of DMF/50 mL of water. Yield=31.1 g (64%), mp 255°–2588° C.: $^1$H NMR (300 MHz, DMSO-$d_6$), 7.95 (d, 4 H), 7.87 (d, 4 H), 7.54 (q, 2 H), and 2.42 (d, 6 H) ppm, $^{13}$C NMR (75 MHz, DMSO-$d_6$) 142.76, 139.45, 128.36, 127.86, and 28.74 ppm. A second recrystallization from 45 mL of DMF and 480 mL of benzonitrile yields 26.0 g of white solid which is vacuum dried overnight at 110° C., and used to prepare polymer 6 (Table 1).

B. Preparation of N,N'-Bis(2-hydroxyethyl)-4,4'-biphenyldisulfonamide

The foregoing procedure is used, except that methylamine is replaced with ethanolamine. Recrystallization twice from 500 mL of absolute ethanol/40 mL of water yields 35.9 g of white solid, mp 203°–206° C.: 1H NMR(300 MHz, DMSO-$d_6$) 7.90 (s, 8 H), 7.71 (s, 2 H), 4.35 (br s, 2 H), 3.38 (t, 4 H), and 2.83 (t, 4 H) ppm; 13C NMR (75 MHz, DMSO-d6) 142.66, 140.73, 128.28, 127.70, 60.10, and 42.25 ppm. A second crop yields an additional 7.0 g of product for a total yield of 42.9 g (77%) of the monomer which is used to synthesize polymer 7 (Table 1).

C. Preparation of Hydroxy-Functional Poly(ether sulfonamides)

Polymer 1

A mechanically stirred mixture of N,N'-dimethyl-(1,3-benzenedisulfonamide) 9.516 g, 36.0 mmol: prepared according to the procedure of F. Chattaway, J. Chem. Soc., 87, 145 (1905)] and the diglycidyl ether of bisphenol A (epoxy equiv. wt.=173.11; 12.464 g, 36.0 mmol) in freshly distilled propylene glycol phenylether (20 mL) is heated to 120° C. under a nitrogen atmosphere. Ten drops of 40% tetraethylammonium hydroxide in water are added, and the temperature of the reaction mixture rises exothermically to 190° C. The resulting solution is allowed to cool to 150° C. and is stirred at that temperature for 45 minutes, during which time additional solvent (25 mL total) is added from time-to-time to maintain efficient stirring as the bulk viscosity of the solution increased. The solution then is diluted to 100 mL with dimethylformamide (DMF) and added to 1:1 methanol/water in a Waring Blender to precipitate white fibrous solid, which is stirred in fresh methanol/water for 24 hours. The product is collected by filtration, allowed to air dry, taken up in DMF (100 mL) and again precipitated from methanol/water to give polymer 1 as a white, fibrous powder [17.90 g, IV=0.76 dL/g (DMF)], which is dried in vacuo at 80° C. for 24 hours. Polymer 1 is represented by the formula:

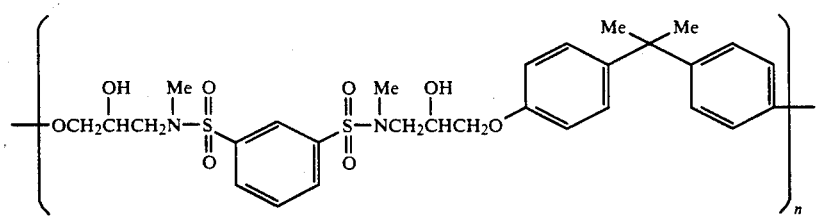

POLYMERS 2-7

Several additional hydroxy-functional poly(ester sulfonamides) are prepared using the foregoing procedure and the disulfonamides and diepoxides corresponding to moieties shown for $R^1$, $R^2$ and $R^3$ in Table I. These polymers are generally represented by the following structural formula

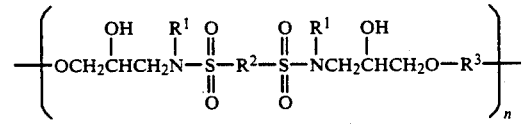

wherein $R^1$, $R^2$ and $R^3$ are as defined in Table I and n is from 10 to 100.

TABLE I

| No. | $R^1$ | $R^2$ | $R^3$ | IV, dL/g[a] | Tg, °C[b] | OTR[c] |
|---|---|---|---|---|---|---|
| 1 | Me— | m-phenylene | 4,4'-isopropylidenediphenylene | 0.76 | 76 | 1.08 |
| 2 | Me— | m-phenylene | p-phenylene | 0.71 | 56 | 0.45 |
| 3 | Me— | m-phenylene | 4,4'-biphenylene | 0.65 | 58 | 1.38 |
| 4 | Me— | m-phenylene | 4,4'-sulfonyldiphenylene | 0.94 | 100 | 0.51 |
| 5 | Me— | m-phenylene | 4,4'-thiodiphenylene | 0.60 | 90 | 0.81 |
| 6 | Me— | 4,4'-biphenylene | 4,4'-isopropylidenediphenylene | 0.43 | 101 | 2.89 |
| 7 | —CH₂CH₂OH | 4,4'-biphenylene | 4,4'-isopropylidenediphenylene | 0.75 | 76 | 0.87 |

[a] IV - inherent viscosity 0.5 g of polymer sample in 100 mL of dimethylformamide at 25° C.
[b] Tg - glass transition temperature.
[c] OTR - oxygen transmission rate in cc-mil/100 in²-day-atm($O_2$) determined for compression molded films (5-10 mil) at 23° C. under the conditions of ASTM Method D-3985; relative humidities of the test gases were 56-69% and 54-60% for oxygen and nitrogen, respectively.

What is claimed is:
1. A thermoplastic polymer comprising a hydroxy-functional poly(ether sulfonamide) represented by the formula:

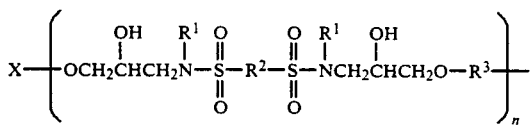

wherein each $R^1$ is independently an alkyl, aryl, substituted alkyl, or substituted aryl moiety, each $R^2$ is independently and predominantly hydrocarbylene moiety or divalent aromatic moiety, each $R^3$ is independently a divalent aromatic moiety, and n is a whole number from 10 to about 1000, X is

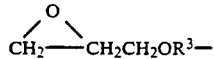

and Y is

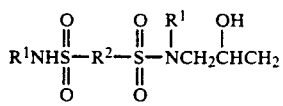

wherein $R^1$, $R^2$ and $R^3$ are as defined previously.

2. The polymer of claim 1 wherein $R^1$ is independently a methyl or hydroxyethyl moiety, $R^2$ is independently a m-phenylene or 4,4-biphenylene moiety, and $R^3$ is independently a p-phenylene, 4,4'-isopropylidenediphenylene, 4,4'-sulfonyldiphenylene or 4,4'-thiodiphenylene moiety.

3. The polymer of claim 2 wherein $R^1$ is a methyl moiety, $R^2$ is a m-phenylene moiety, and $R^3$ is a p-phenylene moiety.

4. The polymer of claim 2 wherein $R^1$ is a methyl moiety, $R^2$ is an m-phenylene moiety, and $R^3$ is a 4,4'-isopropylidenediphenylene moiety.

5. A process for the preparation of the thermoplastic polymer of claim 1 which comprises polymerizing a N,N'-dialkyl- or N,N'-diaryldisulfonamide having the structure:

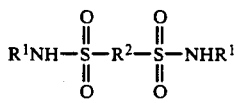

with a diglycidyl ether in the presence of a catalyst.

6. The process of claim 5 wherein the catalyst is an onium catalyst and is tetraethylammonium hydroxide or ethyltriphenylphosphonium acetate.

7. The process of claim 5 wherein the diglycidyl ether is represented by the structure:

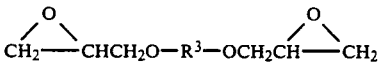

wherein $R^3$ is as defined previously.

8. The polymer of claim 1 in the form of a barrier container.

9. The polymer of claim 1 in the form of a barrier film.

10. The polymer of claim 1 in the form of a barrier coating.